Figure 1:
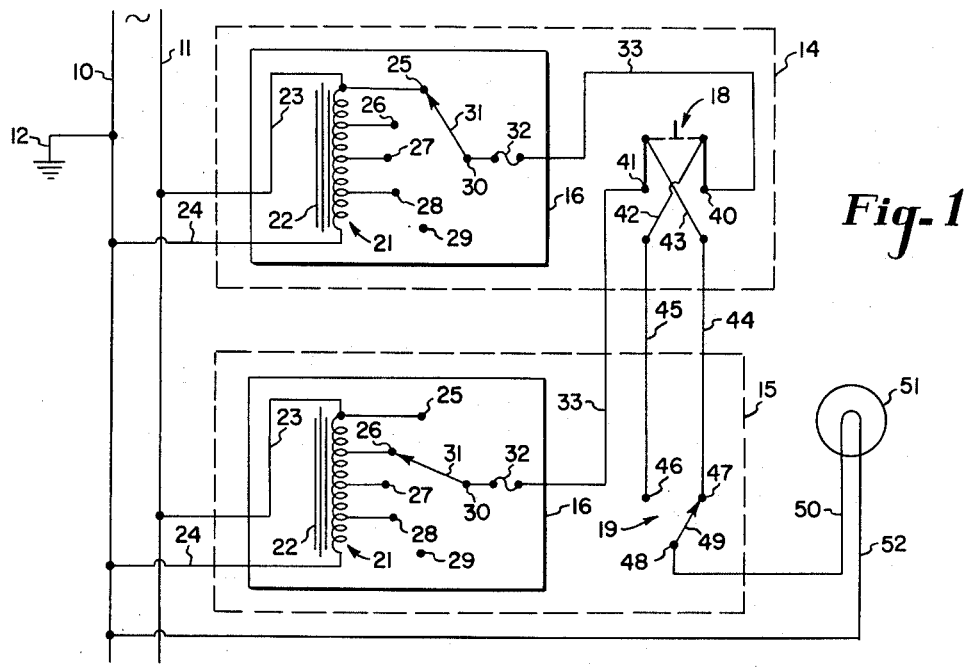

Nov. 28, 1961     J. P. KRIECHBAUM     3,011,095

ELECTRIC LOAD CONTROL SYSTEM

Filed July 2, 1959

INVENTOR.
JOHN P. KRIECHBAUM

BY *Alfred N. Feldman*

ATTORNEY

United States Patent Office

3,011,095
Patented Nov. 28, 1961

3,011,095
ELECTRIC LOAD CONTROL SYSTEM
John P. Kriechbaum, Minneapolis, Minn., assignor to Minneapolis-Honeywell Regulator Company, Minneapolis, Minn., a corporation of Delaware
Filed July 2, 1959, Ser. No. 824,730
8 Claims. (Cl. 315—299)

The present invention is directed to an electric load control system, and more particularly is directed to a light dimmer control circuit for use with either incandescent or fluorescent lighting.

In recent years the use of incandescent and fluorescent light dimming equipment in homes, comercial and industrial locations has become quite common. Many residences use light dimmer equipment in locations such as playrooms and television rooms. Commercial establishments such as restaurants and bars have also taken to using light dimming equipment to facilitate the varying needs they have for different illuminating levels at different times of day. Many types of light dimmmers are on the market commercially at present and representative of these light dimming controls are the Q410A Dim-A-Light brightness control for incandescent lights and the Q410B Dim-A-Light brightness control for fluorescent lights as manufactured by the Minneapolis-Honeywell Regulator Company, assignee of the present invention.

Many different constructions of light dimming controls are available but the Q410A and Q410B noted above are typical of one general type in use. These two units are tapped auto-transformers which provide a means of progressively stepping down the line voltage in fixed voltage increments. The design of a typical unit will be brought out in more detail in connection with the present invention, but it should be understood that it is possible to dim both incandescent and fluorescent lights by the use of this type of light dimming or brightness control equipment.

The use of a single light dimmer with a particular lighting load was the original application of residential and commercial dimmers. As time progressed it became desirable to provide multiple control of a lighting load from either of two or more locations. An example of the use of this type of equipment might be in a restaurant where it would be desirable to control the light level in a dining room from an office as well as from the illuminated location. As such, a need developed for a form of dual control, or remote control, of both incandescent and fluorescent lighting. In order to make the installation of this type of control practical it was necessary to keep the control exceedingly simple, inexpensive, and subject to installation with ordinary electrical components utilized in the electrical wiring trade.

It is the primary object of the present invention to disclose a simple dual control and dual setting arrangement for illumination systems so that the illumination can be varied from more than one location.

It is a further object of the present invention to disclose a remote control light dimming system which could be installed at a low cost by electricians normally working in the construction industry.

A further object of the present invention is to provide a means of presetting two levels of illumination into a lighting system and further being able to select either of these levels at will.

These and other objects will become apparent when the present specification and drawing are considered in their entirety.

Figure 2:
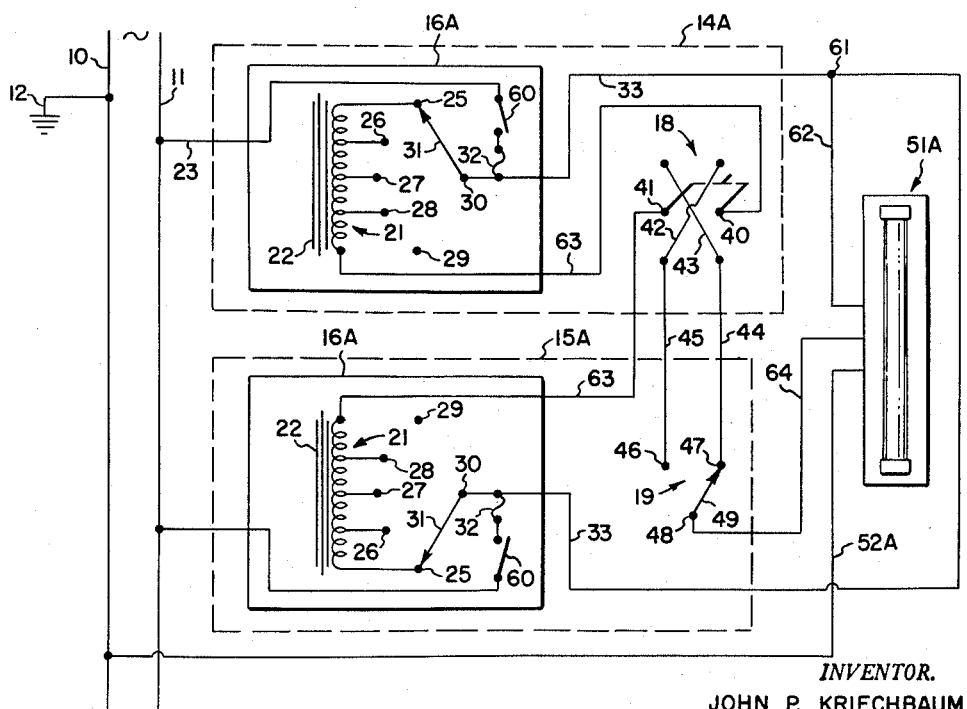

The drawing in the present application discloses in FIGURE 1 a system for controlling an incandescent light load, and FIGURE 2 discloses the control of a fluorescent light load that is capable of being dimmed.

In FIGURE 1 there is disclosed an alternating current power source which is applied to conductors 10 and 11. This source is of substantially constant voltage and represents the commercially available power lines to a home or commercial establishment. One conductor 10 may be grounded at 12 in a conventional manner. Two similar light control units are disclosed at 14 and 15. The units 14 and 15 each are made up of a light dimmer control 16 and an association switch 18 or 19. The control units 16 are identical and correspond to the Q410A Dim-A-Light brightness control mentioned previously in the specification.

Each of the light dimmer controls 16 is made up of an auto-transformer 21 having a core 22 and input leads 23 and 24 which connect to the outside ends of the winding 21. The winding 21 has a group of taps 25, 26, 27, and 28. A tap 29 is left blank as an "off" position for the device. This group of taps can be selectively connected to terminal 30 by means of a wiper 31. The wiper 31 and terminal 30 are connected through a circuit breaker or fuse 32 to an output lead 33.

The output lead 33 of the upper light dimmer control 16 is run to a common terminal 40 of a conventional double pole, double throw reversing switch. This type of switch is sometimes called a 4-way switch. However, any type of reversing means would be suitable. The output lead 33 of the light control unit 15 is connected to the common terminal 41 of the double pole, double throw reversing switch 18. The reversing switch has the normal crossover connections 42 and 43 so that whenever the switch is operated the connection between the common terminals 40 and 41 are reversibly connected to two leads 44 and 45. Leads 44 and 45 are connected to switch 19. The terminals 46 and 47 of the switch 19 are the fixed terminals whereas terminal 48 is a common terminal connected to a switch-blade 49.

The switch terminal 48 is connected by means of conductor 50 to an incandescent light generally shown at 51. The light 51 is then in turn connected by lead 52 to the conductor 10. The connection from the light 51 to the conductor 10 could be accomplished by connection within either of the light control units by connection to conductors 24. The separate conductor 52 has been shown for clarity sake.

The operation of the circuit disclosed in FIGURE 1 can be understood simply by considering the output on conductors 33 as being variable in magnitude depending on the setting of the wiper 31. Since each of the light dimmer controls 16 is connected to the reversing switch 18, it becomes obvious that any further circuit to the reversing switch 18 through the lamp 51 will complete the necessary circuit to light the lamp 51. The particular circuit through the reversing switch 18 is determined by the position of the blade 49 of the switch 19. By moving the blade 49 of switch 19 from the disclosed terminal 47 to terminal 46, it will be noted that the circuit is switched from the light control unit 15 to the light control unit 14. This same switching function from light control unit 15 to light control unit 14 can be accomplished by reversing the switch 18 from the position disclosed. It thus becomes obvious that by operating either switch 18 or 19 it is possible to reverse the connection of the lamp 51 from either of the light control units 14 or 15.

The switches 18 and 19 are generally located physically near the light dimmer control 16. This, however, would not be essential even though they have been schematically shown as being incorporated in the light control units 14 and 15. This is shown as the typical or normal installation but in no way limits the application of the present circuitry.

In FIGURE 2 there is disclosed a circuit substantially identical to the incandescent lighting control circuit of FIGURE 1, but the incandescent light 51 has been replaced by a fluorescent light generally disclosed as 51A. Power lines 10 and 11 supply the necessary potential to the light control units 14A and 15A by means of conductor 23 and the common conductor 52A. The conductors 23 and 52A supply the normal energizing voltage to the light control units 14A and 15A as well as supplying a potential direct to the fluorescent light 51A.

The light control units 14A and 15A are again made up having identical light dimmer controls 16A. The light dimmer controls 16A are slightly different in internal wiring from light dimmer control 16 but have basically the same components in an auto-transformer winding 21, a core 22, and a group of taps to the auto-transformer winding 21. These taps are designated as 25, 26, 27, 28, and 29. A wiper 31 connects the taps to a pivot or terminal 30 which is in turn connected to a fuse or circuit breaker 32. Included in the light dimmer control 16A is a control switch 60 which is utilized to remove power from the fluorescent light fixture whenever the light dimmer control 16A is turned to its lowest or "off" position. This is necessary due to the internal wiring of the fluorescent light 51A. More specifically, fluorescent lights for dimming purposes generally contain a continuous energization of the filaments while the energization of the arc potential is varied to accomplish the variance in illumination. In order to completely turn off the filament potential whenever the light dimmer is in a completely "off" condition, switches 60 are necessary.

The output of the light dimmers 16A are taken on conductors 33 to a common junction 61 which leads to the input 62 of the fluorescent light 51A. The double pole, double throw reversing switch 18 and the single pole, double throw switch 19 are again located adjacent the light control units 14A and 15A. These units are identical to those disclosed in FIGURE 1 and they are interconnected by leads 44 and 45. They again have the crossover connections 42 and 43 as well as the common terminals 41 and 40.

In the circuit for the fluorescent light dimmer the common output leads 63 come from the light dimmer control units 16A and go to the terminals 41 and 40 of the reversing switch 18. The switch 19 again has terminals 46 and 47 which can be selectively connected to the pivot or common terminal 48 by means of the blade 49. The terminal 48 is connected by lead 64 to the fluorescent light 51A.

The operation of the fluorescent light dimmer is substantially the same as that of the incandescent when the difference in the units is considered. The fluorescent light 51A must have continuous power supply to filaments (not shown) to keep the filaments heated and avoid extinguishing the arc or light. The control function of the fluorescent light 51A is accomplished by varying with potential on lead 64 which is connected to the switches 19 and 18 so that the fluorescent light 51A can be connected to either of the light dimmer controls 16A. The operation of the fluorescent circuit and of the incandescent circuit is identical as far as the light control aspect is concerned, and it is believed that anyone familiar with commercially available fluorescent equipment will be fully aware of the function and operation of this circuit.

While the applicant has disclosed the light dimmers as generally applied to an incandescent and fluorescent type light, it is understood that the present arrangement can be utilized in the control of any type of lighting equipment where a variation of voltage can result in a variation of light output. It is further understood that the light dimmer controls 16 and 16A are not limited to tapped auto-transformers but could be of any type of unit wherein a variable voltage output could be obtained from a substantially fixed voltage input. This could well include a continuous step-up or step-down transformer as well as a step-down type of auto-transformer. This also could include any type of variable impedance device such as a magnetic amplifier, an A.C. to D.C. converter having a variable output or any other convenient means of obtaining a difference or controllable voltage for use in light dimming equipment. The applicant believes that the two disclosed variations of the circuit will make the application of the general principle clear to those versed in the art, and the applicant further wishes to be limited in the application of the present idea only in the scope of the appended claims.

I claim as my invention:

1. A light dimmer control circuit of the class described: a power source of substantially constant voltage; two variable step down auto-transformers having fixed input connections and variable tapped output connections; said inputs connected to said power source to energize said transformers; a single pole, double throw switch adjacent one transformer and said switch having a common terminal; a double pole, double throw reversing switch adjacent said other transformer and said switch having two independent common terminals; said tapped output connections being selectively connected from each said transformer to a separate common terminal of said reversing switch; conductor means connecting said single pole, double throw switch to said reversing switch to reversibly transfer said transformers between said switches; and an incandescent lighting load connected between said single pole, double throw switch common and said power source; said lighting load being transferred between said transformers by operation of either of said switches.

2. A light dimmer control circuit of the class described: a power source of substantially constant voltage; two variable step down auto-transformers having fixed input connections and variable tapped output connections; said inputs connected to said power source to energize said transformers; a single pole, double throw switch adjacent one transformer and said switch having a common terminal; a double pole, double throw reversing switch adjacent said other transformer and said switch having two independent common terminals; said tapped output connections being selectively connected from each said transformer to a separate common terminal of said reversing switch; conductor means connecting said single pole, double throw switch to said reversing switch to reversibly transfer said transformers between said switches; and a fluorescent lighting load connected between said single pole, double throw switch common and said power source; said lighting load being transferred between said transformers by operation of either of said switches.

3. A light dimmer control circuit of the class described: a power source; two variable step down ransformers having fixed input means and variable output means; said input means connected to said power source to energize said transformers; a single pole, double throw switch associated with one said transformer and said switch having a common terminal; a double pole, double throw reversing switch associated with the other said transformer and said switch having two independent common terminals; said output means for said transformers connecting each said transformer to a separate common terminal of said reversing switch; conductor means connecting said single pole, double throw and said reversing switch to transfer said transformers between said switches; and lighting load means connected between said single pole, double throw switch common and said power source; said lighting load means being transferred from one transformer to the other upon operation of either of said switches.

4. A light dimmer control circuit of the class described: a power source; two voltage varying means having fixed input means and variable output means; said input means connected to said power source to energize said voltage varying means; a single pole, double throw switch associated with one said voltage varying means and said switch having a common terminal; a double pole, double throw reversing switch associated with the other said voltage varying means and said switch having two independent common terminals; said output means for said voltage varying means connecting each said voltage varying means to a separate common terminal of said reversing switch; conductor means connecting said single pole, double throw and said reversing switch to transfer said voltage varying means between said switches; and lighting load means connected between said single pole, double throw switch common and said power source.

5. A light dimmer control circuit of the class described: a power source; two voltage varying means having fixed input means and variable output means; said input means connected to said power source to energize said voltage varying means; a single pole, double throw switch associated with one said voltage varying means and said switch having a common terminal; a reversing switch associated with the other said voltage varying means; said output means for said voltage varying means connecting each said voltage varying means to said reversing switch; conductor means connecting said single pole, double throw and said reversing switch to transfer said voltage varying means between said switches; and lighting load means connected between said single pole, double throw switch common and said power source.

6. In an electric lighting load control system: a power source; two variable transformers including connection means connected to said source to energize said transformers and each transformer having an independent variable voltage output; an electric lighting load; and switch means at each of said variable transformers connected to said variable voltage outputs to alternately connect said electric lighting load to said independent variable voltage outputs from either of said switch means.

7. In an electric load control system: a power source; two voltage varying means including connection means connected to said source to energize said means and each having an independent variable voltage output; electric load means; and current control means at each of said voltage varying means connected to said variable voltage outputs to selectively connect said load means to either of said independent variable voltage outputs.

8. In an electric load control system: a power source; voltage varying means including connection means connected to said source to energize said means and having a plurality of independent variable voltage outputs; electric load means; and current control means at each of said independent variable voltage outputs connected to said variable voltage outputs to selectively connect said load means to any one of said independent variable voltage outputs.

References Cited in the file of this patent

UNITED STATES PATENTS

| | | |
|---|---|---|
| 1,511,495 | Belden | Oct. 14, 1924 |
| 1,733,763 | Werner | Oct. 29, 1929 |
| 2,268,034 | Hunter | Dec. 30, 1941 |
| 2,334,018 | Mayne | Nov. 9, 1943 |